US008802177B2

(12) United States Patent
Chatel et al.

(10) Patent No.: US 8,802,177 B2
(45) Date of Patent: *Aug. 12, 2014

(54) SOLUBLE OAT OR BARLEY FLOUR AND METHOD OF MAKING UTILIZING A CONTINUOUS COOKER

(75) Inventors: Robert Chatel, Hoffman Estates, IL (US); Yongsoo Chung, Palatine, IL (US); Justin French, Cedar Rapids, IA (US)

(73) Assignee: The Quaker Oats Company, Chicago, IL (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/264,404

(22) Filed: Nov. 4, 2008

(65) Prior Publication Data

US 2010/0112167 A1    May 6, 2010

(51) Int. Cl.
*A23L 1/105* (2006.01)

(52) U.S. Cl.
USPC ........... 426/516; 426/506; 426/448; 426/590; 426/455; 426/569

(58) Field of Classification Search
CPC ....................................................... A23L 1/105
USPC ......... 426/516, 520, 518, 448, 455, 441, 446, 426/460, 569, 506, 590
See application file for complete search history.

(56) References Cited

U.S. PATENT DOCUMENTS

| 1,163,175 | A | * | 12/1915 | Rullman ...................... 426/575 |
| 3,595,671 | A | * | 7/1971 | Cooke et al. .................... 426/23 |
| 4,500,558 | A | * | 2/1985 | Fulger et al. ................... 426/622 |
| 4,551,347 | A | * | 11/1985 | Karwowski .................... 426/621 |
| 4,996,063 | A | | 2/1991 | Inglett |
| 5,385,746 | A | | 1/1995 | De Almeida |
| 5,476,675 | A | * | 12/1995 | Lou et al. ...................... 426/590 |
| 5,523,109 | A | * | 6/1996 | Hellweg et al. ............... 426/618 |
| 5,932,264 | A | * | 8/1999 | Hurd et al. .................... 426/511 |
| 6,210,741 | B1 | | 4/2001 | van Lengerich et al. |
| 6,221,421 | B1 | * | 4/2001 | Wullschleger et al. ....... 426/590 |
| 6,482,459 | B1 | | 11/2002 | Anderson |
| 7,244,457 | B2 | | 7/2007 | Racicot et al. |
| 2004/0156971 | A1 | | 8/2004 | Wuersch et al. |
| 2007/0141218 | A1 | | 6/2007 | Chatel et al. |
| 2007/0154609 | A1 | | 7/2007 | Li et al. |
| 2007/0264400 | A1 | | 11/2007 | Milne et al. |
| 2008/0003340 | A1 | | 1/2008 | Karwowski et al. |

FOREIGN PATENT DOCUMENTS

| AU | 37579 72 | | 7/1973 |
| CN | 1499940 | A | 5/2004 |
| DE | 970141 | | 8/1958 |
| DE | 102005039155 | | 2/2007 |
| EP | 0634106 | | 1/1995 |
| EP | 1854367 | | 11/2007 |
| FR | 2907029 | | 4/2008 |
| JP | 63-116657 | | 5/1988 |
| RU | 2237419 | | 10/2004 |
| TW | 58246 | | 5/1984 |
| WO | 9210106 | A1 | 6/1992 |
| WO | 9604799 | | 2/1996 |
| WO | 02076244 | | 10/2002 |

OTHER PUBLICATIONS

Office Action received for corresponding Russian Patent Application 2009149382 mailed Dec. 6, 2010.
L.C. Gutkoski and A.A. El-Dash: Plant Foods for Human Nutrition, "Effect of extrusion process variables on physical and chemical properties of extruded out products", vol. 54, pp. 315-325, dated 1999.
PCT/US2009/059916, International Search Report and Written Opinion, mailed Feb. 16, 2010.
XP-002561727, URL:http://web.archive.org/web/20080420075151/http://www.aspsk.sk/ovsene_mlieko.htm>[ whole document retrived from Internet on Dec. 28, 2009], p. 1-1, dated Apr. 20, 2008.
XP-002561728, Anonymous: "Goldkill Instant Barley Drink", URL:http://web.archive.org/web/20060303003347/goldkili.com/goldkili_instant.php>[p. 1, retrived from Internet on Dec. 28, 2009], pp. 1-2, dated Mar. 3, 2006.
XP002499645, Peter Koelln KGaA: "Kochjule, Hafer-Getrank mit Fruchtsaft", XP002499645, URL:http://www.koelln.de/downloads/37/Ooch jule.pdf>[pp. 9, 18, retrieved from Internet on Oct. 14, 2008], pp. 1-19, dated Oct. 14, 2008.
XP002499437, Peter Kolln KGaA: "KollnFlocken Instant", URL:http://www.koelln.de/produkte/1/15/ind ex.html> [retrieved whole document from Internet Oct. 13, 2008], p. 1, dated Oct. 13, 2008.
XP002499438, Peter Kolln KGaA: "Kolln Schmelzflocken Dinkel-Hafer", URL:http://www.koelln.de/produkte/2/103/index.html>[retrieved whole document from Internet on Oct. 13, 2008], p. 1, dated Oct. 13, 2008.
Office Action received for corresponding European Application 09737291.6 mailed Jul. 25, 2011.
Zhang Haodong, "Starch Article Technology", Jilin Science and Technology Press, dated Feb. 29, 2008.
TW Application No. 98134765, Office Action dated Aug. 8, 2012.
CN Application No. 200980000588.8, Office Action dated Jul. 31, 2012.
Colombia Application 10.000.523, Office Action dated Jan. 22, 2013.
Chinese Application No. 200980000588.8, Office Action mailed Apr. 11, 2013.

\* cited by examiner

*Primary Examiner* — Steven Leff
(74) *Attorney, Agent, or Firm* — Bannber & Witcoff, Ltd.

(57) ABSTRACT

Preparing soluble oat or barley flour in one-step using an extrusion (continuous cooking) process to dextrinize and gelatinize cook the oat or barley flour.

14 Claims, No Drawings

SOLUBLE OAT OR BARLEY FLOUR AND METHOD OF MAKING UTILIZING A CONTINUOUS COOKER

FIELD OF THE INVENTION

The present invention relates generally to soluble oat or barley flour. More specifically, the present invention relates to methods of making soluble oat or barley flour.

BACKGROUND

Oatmeal has for many years been a staple of the human diet due to its health benefits. For example, numerous studies have shown that eating oatmeal on a daily basis can help lower blood cholesterol, reduce risk of heart disease, promote healthy blood flows as well as maintain healthy blood pressure levels. Additionally, oatmeal has high content of complex carbohydrates and fibers, which facilitates slow digestion and stable blood-glucose levels.

With today's hectic lifestyle, consumers are demanding convenience, such as portability and ease of preparation. Consumers desire oatmeal from a variety of food sources including beverages, and convenience foods such as bars, cookies, crackers, smoothies, and the like.

It is desired to prepare a whole oat product that has sufficient soluble fiber to meet the FDA threshold necessary to justify a health claim. For example, a whole oat product must have 0.75 g soluble beta-glucan fiber per serving of food. To prepare an oat beverage that contains at least 0.75 g soluble oat fiber per serving (about 18 g of whole grain oats), highly soluble oat flour must be used. Traditionally, highly soluble flour is prepared using enzymes such as α-amylase. The enzyme-treated oat flour is then drum or spray dried. This method takes place in at least two steps and is traditionally expensive and produces the soluble oat flour in low rates. For example, a slurry batch is prepared of flour (oat) and water (70-90% moisture content). Enzyme(s) are then added to the slurry and held at optimum enzyme reaction conditions followed by enzyme deactivation process. The slurry is then transferred into either a spray or drum drier. More efficient processes are desired to prepare the oatmeal product.

Likewise, barley has become a desired staple of the human diet for health reasons and suitable means to process and prepare barley containing products is desired.

SUMMARY

Aspects of the present invention relate to preparing soluble oat or barley flour in one-step using an extrusion (continuous cooking) process to gelatinize and dextrinize the oat flour.

These and other aspects, along with advantages and features of the present invention herein disclosed, will become apparent through reference to the following description. Furthermore, it is to be understood that the features of the various embodiments described herein are not mutually exclusive and can exist in various combinations and permutations.

DETAILED DESCRIPTION

The present invention relates to soluble oat or barley flour and a method of producing soluble oat or barley flour using a continuous cooker to gelatinize and dextrinize whole oat or barley flour in one step. The process is easier, less expensive, and less time-consuming than prior art processes.

A starting mixture is prepared containing whole oat or barley flour, granulated sugar, optionally a maltodextrin, and at least one antioxidant.

The whole oat or barley flour is present in an amount of about 50% to about 95% by weight of the total weight of the starting composition. In further aspects, the whole oat or barley flour is present in amounts of about 80% to about 95% by weight or about 90% to about 95% by weight.

The sugar can be any suitable sugar known to those skilled in the art. Non-limiting examples of sugars include sucrose, fructose, dextrose, other sugars known in the art, and combinations thereof. Typically, the sugar is present in an amount of about 3% to about 15% by weight of the total weight of the starting composition. In further aspects, the sugar is present in amounts of about 3% to about 7% by weight.

The maltodextrin may be present in an amount of about 0% to about 15% by weight of the total weight of the starting composition. In further aspects, the maltodextrin is present in amounts of about 3% to about 7% by weight.

The antioxidant may be any suitable antioxidant such as mixed natural tocopherols or artificial antioxidant such as BHT and BHA. The antioxidant is present in an amount from 0.1% to 2% by weight. In further aspects, the antioxidant is present in amounts of about 0.25% to about 0.75% by weight.

The mixture may be pre-hydrated in a preconditioner prior to extrusion. It is well known in the industry that pre-conditioners can aide in reducing the required mechanical power of the extruder to cook the mixture. The pre-conditioner will give an overall increase in throughput. In the pre-conditioner, water or steam is added to increase the moisture content of the mixture to about 25 to about 35%, more specifically about 28 to about 30%. The mixture's overall temperature is increased to about 140° F.-160° F. prior to extrusion. The mixture has the characteristics of a uniform free flowing wetted material prior to extrusion.

Starch gelatinization requires water and heat. The gelatinization temperature range for oats is 127° F. to 138° F. (53-59° C.). If the moisture is less than about 60% then higher temperatures are required. Typically the extrusion occurs at barrel temperatures between 140° F. and 250° F. The dough temperatures are approximately 212° F. and 260° F.

The mixture is fed into the extruder. Any suitable extruder may be used including suitable single screw or twin screw extruders. Typical, but not limiting, screw speeds are 200-300 rpm.

For example, a hydrated mixture at a temperature of about 140° F.-160° F. is fed into a low-shear cooking extruder. Low-shear cooking extrusion is defined by a moisture range of 20 to 35%, a shear rate range of 20 to 100 s$^{-1}$, mechanical energy input of 0.02 to 0.05 kw-hr/kg and maximum dough temperature less than or equal to 150° C. *Extrusion of Foods* by Judson M. Harper CRC Press 1980

Heat may be applied through the extruder barrel wall such as with a jacket around the barrel through which a hot medium like steam, water or oil is circulated, or electric heaters imbedded in the barrel. Heat is also generated within the material by friction as it moves within the extruder. Shear is controlled by the design of the extruder screw(s) and the screw speed. Viscosity is a function of starch structure, temperature, moisture content, fat content and shear. The shear stresses and heat applied in the extruder to the starches, especially the amylopectin, reduce their average molecular weight.

The extruded dough exits the cooking extruder. As it exits, water immediately evaporates cooling the dough and dropping its moisture content into the 25 to 30% range. The dough is then fed into a second forming extruder where it is further cooled below the boiling point of water, forced through a die opening and cut into pellets. The 25 to 30% moisture pellets are then transported to a pellet drier and de-hydrated to approx 7- 10% moisture; specifically 8-9%. The pellets may then be granulated. Granulation specifications can be widened. 50-250 microns. Specifically, targeting 178-250 micron; maximizing 212 microns The granulated product may be used in beverages such as ready-to-drink beverages, fruit juices, dairy beverages, and carbonated soft drinks, and various food products such as bars, cereals, puddings, smoothies, powdered beverages, cookies, crackers, and the like. The soluble oat flour can also be used to make soft food products such as ice cream and soft yogurt. This list is not all-inclusive and one skilled in the art would recognize that the soluble oat flour may be added to other beverages and food products in accordance with the invention.

A beverage, for example, contains from about 1% to about 25% soluble oat or barley flour and from about 70% to about 95% total water, typically about 75% to about 90%, by weight of the total beverage. The balance can contain sweeteners, flavors, fruits and other materials as desired.

The water should be suitable for use in food. The total water may come in part or in whole from other parts of the drinkable food, especially if milk, juices, or other water containing components are used. For instance, the milk may be dairy (e.g. whole, 2%, 1%, or non-fat) or non-dairy (e.g. soy). The milk may also be produced from powdered milk and water.

The beverage may also include a fruit component. The fruit component can include fruit juice, yogurt containing fruit, fruit puree; fresh fruit, fruit preserves, fruit sorbet, fruit sherbet, dried fruit powder, and combinations thereof. Typically, the fruit component has particles sufficiently small that the component may be safely swallowed without chewing. The fruit component and/or an added acidulant can be adjusted to obtain a desired pH, for example a pH of less than about 4.6.

Food products include cereals and ready-to-eat snack bars. A suitable amount of the granulated product is added to the food mixture.

Additional ingredients may be added to the beverage and food products. Such ingredients can include non grain-based ingredients. For example, flavoring agents, coloring agents, sweeteners, salt, as well as vitamins and minerals can be included. In one embodiment of the invention, flavoring agents such as strawberry, chocolate or cinnamon flavor is added to enhance the taste of product. Other fruit flavoring agent may also be useful to provide different tastes to the food product, for example, strawberry, mango and banana and mixtures thereof. Spices, in particular, cinnamon, can be used. In addition, any desired flavor or flavors can be used. Suitable sweeteners—artificial or natural can be added in the food product to provide a desired sweetness. For example, brown sugar, maple sugar or fruit sugar can be used. The non-grain based food component can be added in the range of about 10 to 75 wt % of the total weight of the product.

Other optional ingredients, but are not limited to, salt, hydrocolloids, polysaccharides, thickeners, caffeine, dairy, coffee solids, tea solids, herbs, nutraceutical compounds, electrolytes, vitamins, minerals, amino acids, preservatives, alcohol, colorants, emulsifiers, and oils as known in the art.

The soluble oat or barley flour includes beta glucan soluble fiber, such as beta-1,3-glucan, beta-1,6-glucan, or beta-1,4-glucan or mixtures thereof. In addition to beta glucan naturally present in the oats, beta glucan may be added as approved by the FDA. In certain embodiments, the oat flour preferably contains at least about 3% to 5% or about 3.7% to 4% beta glucan. In certain embodiments, the oat flour containing liquid product contains 0.1% to about 1.5% beta glucan, or about 0.8% to 1.3% beta glucan. Other amounts of beta glucan are also useful.

As described, the present invention provides a healthy drinkable food product which is easy and quick to prepare while convenient to consume on-the-go, making it especially appealing to consumers with today's hectic lifestyle.

Example 1

A flour mix formula for extrusion process

| Ingredient | % |
|---|---|
| Whole oat flour | 86.5 |
| Sugar | 5 |
| Maltodextrin | 5 |
| Mixed tocopherols | 0.5 |
| Waxy corn starch | 3 |
| Total | 100.00 |

Example 2

A cracker formula is typically made from whole wheat flour or wheat gluten. Instead the formula would be replaced with this hydrolyzed oat flour to improve nutritional benefits (heart health) as well as provide adequate strength to the dough be sheeted and cut into crackers. The formula would include:

| Modified corn starch | 10.00 |
|---|---|
| Oat flour, Hydrolyzed | 48.00 |
| Oat flakes, old fashioned | 17.00 |
| Brown sugar, free-flowing | 12.00 |
| Malt powder, Briess #10001 | 4.00 |
| Lecithin, powdered, Centrolex F | 2.00 |
| Sodium aluminum phosphate | 0.80 |
| Sodium bicarbonate | 0.70 |
| Salt, flour | 0.60 |
| Corn Oil, with TBHQ, ADM | 5.00 |
| Total | 100.00 |

Example 3

A formula for oat ice cream

| Ingredient | % |
|---|---|
| 2% Milk | 87.0 |
| Oat flour, hydrolyzed | 6.5 |
| Sugar | 5.4 |
| Cocoa powder | 0.8 |
| Flavor | 0.2 |
| Modified starch | 0.1 |
| Total | 100.0 |

The invention may be embodied in other specific forms without departing from the spirit or essential characteristics thereof The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method of producing a soluble whole oat or barley flour comprising hydrating and heating to 140° F.-160° F. a whole oat or barley flour starting mixture to form a uniform free flowing wetted material having a moisture level of about 28 to about 30% by weight, wherein the whole oat or barley flour starting mixture comprises about 80 to about 95% by weight whole oat or barley flour, sugar, and at least one antioxidant;

adding the hydrated whole oat or barley flour starting mixture to a low-shear extruder, wherein the extruder barrel temperature of about 140° F. to about 250° F.;

extruding the whole oat or barley flour starting mixture at a screw speed of 200 to 300 rpm to obtain a dough having a temperature of 212° F.-260° F., and to gelatinize and dextrinize the dough within the extruder; and granulating the dough exiting the extruder to form the soluble whole oat or barley flour having a particle size of 50 to 250 microns.

2. The method of claim 1 wherein the whole oat or barley flour starting mixture further comprises maltodextrin.

3. The method of claim 1 wherein the whole oat flour or barley starting mixture further comprises about 3 to about 15% by weight sugar, 0 to about 15% by weight maltodextrin, and from about 0.1% to about 2% by weight of at least one antioxidant.

4. The method of claim 1 wherein the whole oat flour or barley starting mixture comprises about 90 to about 95% by weight whole oat or barley flour.

5. The method of claim 1 further comprising extruding at a shear rate range of 20-100 s-1.

6. The method of claim 1 further comprising extruding with a mechanical energy input of 0.02-0.05 kw-hr/kg.

7. A method for preparing a beverage containing a soluble whole oat or barley flour comprising:

hydrating and heating to 140° F.-160° F. a whole oat or barley flour starting mixture to form a uniform free flowing wetted material having a moisture level of about 28 to about 30% by weight, wherein the whole oat or barley flour starting mixture comprises about 80 to about 95% by weight whole oat or barley flour, sugar, and at least one antioxidant;

adding the hydrated whole oat or barley flour starting mixture to a low-shear extruder, wherein the extruder barrel temperature of about 140° F. to about 250° F.;

extruding the whole oat or barley flour starting mixture and heat at a screw seed of 200 to 300 rpm to obtain a dough having a temperature of 212° F.-260° F., and to gelatinize and dextrinize the dough within the extruder;

granulating the dough exiting the extruder to form the soluble oat or barley flour having a particle size of 50 to 250 microns; and adding the soluble whole oat or barley flour to a beverage, wherein the soluble flour is added to provide a beverage having 1 to 25% by weight soluble fiber based on total weight of the beverage.

8. The method of claim 7 wherein the beverage is selected from the group consisting of fruit juices, dairy beverages, and carbonated soft drinks.

9. A beverage prepared in accordance with the method of claim 7.

10. The method of claim 7 wherein the whole oat or barley flour starting mixture further comprises maltodextrin.

11. The method of claim 7 wherein the whole oat flour or barley starting mixture further comprises about 3 to about 15% by weight sugar, 0 to about 15% by weight maltodextrin, and from about 0.1% to about 2% by weight of at least one antioxidant.

12. The method of claim 7 wherein the whole oat flour or barley starting mixture comprises about 90 to about 95% by weight whole oat or barley flour.

13. The method of claim 7 further comprising extruding at a shear rate range of 20-100 s-1.

14. The method of claim 7 further comprising extruding with a mechanical energy input of 0.02-0.05 kw-hr/kg.

* * * * *